United States Patent [19]
Scherbel et al.

[11] Patent Number: 5,688,835
[45] Date of Patent: Nov. 18, 1997

[54] PREPARATION OF POLYURETHANE RIGID FOAMS

[75] Inventors: Karin Scherbel; Katrin Ebert, both of Schwarzheide; Hartmut Appenroth, Arnsdorf; Peter von Malotki, Cosel, all of Germany

[73] Assignee: BASF Elastogran GmbH, Lemforde, Germany

[21] Appl. No.: 591,328

[22] Filed: Jan. 25, 1996

[30]  Foreign Application Priority Data

Jan. 31, 1995 [DE] Germany ............... 195 02 969.0

[51] Int. Cl.$^6$ ............... C08G 18/32; C08G 18/34; C08G 18/36
[52] U.S. Cl. ............... 521/131; 521/172; 521/174
[58] Field of Search ............... 521/131, 172, 521/174

[56]  References Cited

U.S. PATENT DOCUMENTS

| | | | |
|---|---|---|---|
| 4,954,537 | 9/1990 | Sanns, Jr. | 521/157 |
| 5,198,508 | 3/1993 | Ueda et al. | 525/454 |

FOREIGN PATENT DOCUMENTS

| | | |
|---|---|---|
| 0554750 | 8/1993 | European Pat. Off. . |
| 0610714 | 8/1994 | European Pat. Off. . |

*Primary Examiner*—Morton Foelak
*Attorney, Agent, or Firm*—Fernando A. Borrego

[57] ABSTRACT

A process for producing polyurethane rigid foams comprises reacting a) organic polyisocyanates b) relatively high molecular weight compounds containing at least two respective hydrogen atoms and, if desired, c) low molecular weight chain extenders and/or crosslinkers in the presence of d) blowing agents e) catalysts and, if desired, f) auxiliaries and additives, wherein the relatively high molecular weight compounds containing at least two reactive hydrogen atoms comprise a mixture of a1) one or more high-functional, polyether alcohols having functionalities of from 6 to 8 and mean equivalent masses of from 125 to 200, a2) one or more polyether alcohols based on aliphatic amines having functionalities of from 3 to 4 and mean equivalent masses of from 70 to 130, a3) one or more low-functional polyether alcohols having functionalities of from 2 to 3 and mean equivalent masses of from 67 to 250, and a4) an OH-containing fatty acid ester.

7 Claims, No Drawings

PREPARATION OF POLYURETHANE RIGID FOAMS

The invention relates to a process for preparing polyurethane rigid foams which can be used, in particular, for the insulation of refrigeration and freezer appliances.

The filling of hollow spaces in refrigeration and freezer appliances with polyurethane rigid foams is known.

These hollow spaces are bounded by covering layers of different materials, eg. steel sheet, impact-toughened polystyrene, acrylonitrile-butadiene-styrene copolymers, polypropylene or paper-coated aluminum foil.

The task of the polyurethane rigid foams is to fill the hollow spaces uniformly and without cavities, to produce a stable construction by means of very good bonding to the covering layers and to provide good thermal insulation.

Suitable polyurethane rigid foams can be produced in a known manner by reacting organic polyisocyanates with one or more compounds containing at least two reactive hydrogen atoms, preferably polyester and/or polyether alcohols in the presence of blowing agents, catalysts and, if desired, auxiliaries and/or additives.

A summary overview of the production of polyurethane rigid foams and their use in refrigeration and freezer appliances is given, for example, in Kunststoff-Handbuch, Volume 7, Polyurethane, 3rd Edition 1993, by Dr. Günter Oertel, Carl-Hanser-Verlag, Munich/Vienna.

Blowing agents used in the past for polyurethane rigid foams have preferably been fluorine- and chlorine-containing hydrocarbons (CFCs), in particular monofluorotrichloromethane. Although they met the technical requirements very well, owing to their high ozone damage and greenhouse potential intensive efforts have been made to replace them and alternative blowing agents have been sought.

For this purpose, the suitability of hydrocarbons containing hydrogen, fluorine and chlorine (HCFCs), perfluorinated and partially fluorinated hydrocarbons (FCs and UFCs) and also hydrocarbons has been examined.

Apart from the HCFCs and FCs, hydrocarbons in particular have, owing to their virtually nonexistent ozone damage potential and their negligible greenhouse potential, becomes established as blowing agents in polyurethane rigid foam systems for refrigeration and freezer appliances.

EP-A 421 269 proposes cyclopentane in particular as blowing agents for rigid foams, this being available in sufficient purity and leading, with appropriate formulation, to homogeneous, clear polyol components which can be reacted with isocyanates to give polyurethane rigid foams having satisfactory properties, in particular a low thermal conductivity, rapid curing and good dimensional stability.

A disadvantage is the relatively high price of cyclopentane. It would be advantageous to use the substantially lower-cost low-boiling aliphatic pentanes as blowing agents for polyurethane rigid foams, these having the same advantageous properties as cyclopentane in terms of environmental compatibility.

However, the use of aliphatic pentanes as blowing agents has hitherto led not only to a higher thermal conductivity of the polyurethane rigid foams, but in particular to homogeneity problems in the polyol component. Use of aliphatic pentane in the amounts customary for blowing agents resulted in phase separation so that processing of the polyol component in conventional machines was no longer possible.

Although it is possible, to eliminate this deficiency by adding relatively high molecular weight polyether alcohols to improve the homogeneity of the polyol component, to the extent required for processing on conventional machines to be possible, this impairs the curing of the polyurethane rigid foams.

It is an object of the present invention to provide systems for producing polyurethane rigid foams, in particular for insulating refrigeration and freezer appliances, in which low-boiling aliphatic hydrocarbons can be used as blowing agents without resulting in inhomogeneities of the polyol component and thus giving processing difficulties.

We have found that this object is achieved by a process for producing polyurethane rigid foams in which the polyol component used is a mixture of

- one or more high-functional polyether alcohols having functionalities of from 6 to 8 and mean equivalent masses of from 80 to 110,
- one or more polyether alcohols based on aliphatic amines having functionalities of from 3 to 4 and mean equivalent masses of from 70 to 130,
- one or more low-functional polyether alcohols having functionalities of from 2 to 3 and mean equivalent masses of from 67 to 250, and
- an OH-containing fatty acid ester.

The invention accordingly provides a process for producing polyurethane rigid foams by reacting a) organic polyisocyanates b) relatively high molecular weight compounds containing at least two reactive hydrogen atoms and, if desired, c) low molecular weight chain extenders and/or crosslinkers in the presence of d) blowing agents e) catalysts and, if desired, f) auxiliaries and additives, wherein the relatively high molecular weight compounds containing at least two reactive hydrogen atoms comprise a mixture of b1) one or more high-functional, polyether alcohols having functionalities of from 6 to 8 and mean equivalent masses of from 125 to 200, b2) one or more polyether alcohols based on aliphatic amines having functionalities of from 3 to 4 and mean equivalent masses of from 70 to 130, b3) one or more low-functional polyether alcohols having functionalities of from 2 to 3 and mean equivalent masses of from.67 to 250, and b4) an OH-containing fatty acid ester.

In a particularly advantageous embodiment, the polyol component (b) comprises a mixture of b1) from 20 to 60 parts by weight of one or more high-functional polyether alcohols having functionalities of from 6 to 8 and mean equivalent masses of from 125 to 200, b2) from 5 to 30 parts by weight of one or more polyether alcohols based on aliphatic amines having functionalities of from 3 to 4 and mean equivalent masses of from 70 to 130, b3) from 3 to 25 parts by weight of one or more low-functional polyether alcohols having functionalities of from 2 to 3 and mean equivalent masses of from 67 to 250, and b4) from 8 to 20 parts by weight of an ester of glycerol and OH-containing fatty acids.

In particular, the ester of glycerol and OH-containing fatty acids which is used is castor oil.

The equivalent mass is determined by dividing the mean molecular mass of the polyol, determined by gel chromatography or similar methods, by the mean functionality of the polyol.

The polyol component used according to the invention preferably has a mean hydroxyl number of from 350 to 390 mg KOH/g.

The process of the invention is preferably carried out at an isocyanate index of from 115 to 130.

Blowing agents used are preferably low-boiling aliphatic hydrocarbons. In particular, use is made of the aliphatic pentane isomers, either individually or in a mixture, preferably pure n-pentane.

The following may be said about the individual components which are used in the process of the invention:

a) Suitable organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, for example 1,12-dodecane diisocyanate, 2-ethyltetramethylene 1,4-diisocyanate, 2-methylpentamethylene, 1,5-diisocyanate, tetramethylene 1,4-diisocyanate and preferably hexamethylene 1,6-diisocyanate; cycloaliphatic diisocyanates such as cyclohexane 1,3-diisocyanate and 1,4-diisocyanate and also any mixtures of these isomers, 1-isocyanato-3,3,5-trimethyl-5-isocyanatomethylcyclohexane (isophorone diisocyanate), 2,4- and 2,6-hexahydrotolylene diisocyanate and also the corresponding isomer mixtures, 4,4'-, 2,2'- and 2,4'-dicyclohexylmethane diisocyanate and also the corresponding isomer mixtures, and preferably aromatic diisocyanates and polyisocyanates such as 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (raw MDI) and mixtures of raw MDI and tolylene diisocyanates. The organic diisocyanates and polyisocyanates can be used either individually or in the form of their mixture.

Frequently, use is also made of modified polyfunctional isocyanates, ie. products which are obtained by chemical reaction of organic diisocyanates and/or polyisocyanates. Examples which may be mentioned are diisocyanates and/or polyisocyanates containing ester, urea, biuret, allophanate, carbodiimide isocyanurate, uretdione and/or urethane groups. Specific examples are: organic, preferably aromatic, polyisocyanates containing urethane groups and from 33.6 to 15% by weight, preferably from 31 to 21% by weight, of NCO, based on the total weight, for example 4,4'-diphenylmethane diisocyanate modified with low molecular weight diols, triols, dialkylene glycols, trialkylene glycols or polyoxyalkylene glycols having molecular weights of up to 1500, modified 4,4'- and 2,4'-diphenylmethane diisocyanate mixtures, or modified raw MDI or 2,4- or 2,6-tolylene diisocyanate, with examples of dialkylene or polyoxyalkylene glycols, which can be used either individually or as mixtures, being: diethylene and dipropylene glycols, polyoxyethylene, polyoxypropylene and polyoxypropylene-polyoxyethylene glycols, triols and/or tetrols. Also suitable are NCO-containing prepolymers containing from 25 to 3.5% by weight, preferably from 21 to 14% by weight, of NCO, based on the total weight, prepared from the polyester-polyols and/or preferably polyether-polyols described below and 4,4'-diphenylmethane diisocyanate, mixtures of 2,4'- and 4,4'- diphenylmethane diisocyanate, 2,4- and/or 2,6-tolylene diisocyanates or raw MDI. Other compounds which have been found to be suitable are liquid polyisocyanates containing carbodiimide groups and/or isocyanurate rings and from 33.6 to 15% by weight, preferably from 31 to 21% by weight, of NCO, based on the total weight, eg. based on 4,4'-, 2,4'- and/or 2,2'-diphenylmethane diisocyanate and/or 2,4- and/or 2,6-tolylene diisocyanate.

The modified polyisocyanates can, if desired, be mixed with one another or with unmodified organic polyisocyanates such as 2,4'-, 4,4'-diphenylmethane diisocyanate, raw MDI, 2,4- and/or 2,6-tolylene diisocyanates.

Organic polyisocyanates which have been found to be particularly useful and are therefore preferably used are: mixtures of tolylene diisocyanates and raw MDI or mixtures of modified organic polyisocyanates containing urethane groups and from 33.6 to 15% by weight of NCO, in particular those based on tolylene diisocyanates, 4,4'-diphenylmethane diisocyanate, diphenylmethane diisocyanate isomer mixtures or raw MDI and, in particular, raw MDI containing from 30 to 80% by weight, preferably from 30 to 55% by weight, of diphenylmethane diisocyanate isomers.

b) The polyether-polyols used are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts and with the addition of at least one initiator molecule containing from 2 to 8, preferably from 2 to 6, reactive hydrogen atoms bonded to it, or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide.

The alkylene oxides can be used individually, successively or as mixtures.

Suitable initiator molecules for the polyether alcohols used according to the invention are the following compounds:

b1) Initiator substances used are, in particular, hydroxyl-containing high-functional compounds, in particular sugar, starch or lignin. Of particular practical importance are glucose, sucrose and sorbitol. Since these compounds are present in solid form under the usual reaction conditions of alkoxylation, it is generally customary to alkoxylate these compounds together with coinitiators. Suitable coinitiators are, in particular, water and polyfunctional lower alcohols, for example glycerol, ethylene glycol, propylene glycol and their lower homologs.

b2) Use is made of, in particular, ammonia, polyfunctional aliphatic amines, in particular those containing from 2 to 6 carbon atoms and primary and secondary amino groups, and also amino alcohols having from 2 to 6 carbon atoms in the main chain.

Preference is given to using ethylenediamine, monoalkylethylenediamine, 1,3-propylenediamine and also various butylenediamines and hexamethylenediamines; and as amino alcohols ethanolamine, diethanolamine and triethanolamine.

b3) Initiator substances used are water and/or low-molecular weight difunctional and/or trifunctional alcohols. Particular preference is given to using linear or branched alcohols, preferably those having from 2 to 6 carbon atoms in the main chain.

Compounds preferably used as initiator substances are, apart from water, ethylene glycol, propylene glycol, diethylene glycol, dipropylene glycol, 1,4-butanediol, 1,5-hexanediol, glycerol and trimethylolpropane.

The alkylene oxides used for preparing the polyetherols b1, b2 and b3 are lower alkylene oxides, in particular those having up to 4 carbon atoms. Of particular industrial importance are ethylene oxide and 1,2-propylene oxide.

The polyether alcohols used according to the invention are usually prepared by the anionic reaction mechanism. For this purpose, the initiator substance is first admixed with a basic catalyst. The basic catalysts used are usually alkali metal or alkaline earth metal hydroxides and carbonates, in particular potassium hydroxide.

The molecular addition of the alkylene oxides is usually carried out at from 80° to 130° C. and pressure of from 0.1 to 1.0 mPa. After the molecular addition of the alkylene oxides, the basic catalyst is neutralized and the polyether alcohol is worked up by removing the solids, usually by filtration, and removing the volatile constituents, usually by vacuum distillation to keep the thermal stressing of the polyether alcohol low.

c) The polyurethane rigid foams can be produced with or without use of chain extenders and/or crosslinkers. However, the addition of chain extenders, crosslinkers or, if desired, also mixtures thereof can be advantageous for modifying the mechanical properties, eg. the hardness. Chain extenders and/or crosslinkers used are diols and/or triols having molecular weights less than 400, preferably from 60 to 300. Examples are aliphatic, cycloaliphatic and/or araliphatic diols having from 2 to 14, preferably from 4 to 10, carbon atoms, such as ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane, and low molecular weight hydroxyl-containing polyalkylene oxides based on ethylene and/or 1,2-propylene oxide and the abovementioned diols and/or triols as initiator molecules.

If chain extenders, crosslinkers or mixtures thereof are used for producing the polyurethane rigid foams, these are advantageously used in an amount of from 0 to 20% by weight, preferably from 2 to 8% by weight, based on the weight of the polyol compound (b).

d) Blowing agents used for the process of the invention can be the customary blowing agents for producing polyurethane rigid foams.

Advantageously, low-boiling aliphatic hydrocarbons, preferably n-pentane and/or iso-pentane, in particular n-pentane, are used as blowing agents.

n-Pentane has a boiling point of 36° C., iso-pentane a boiling point of 28° C. The boiling points are thus in a favorable range for the blowing process.

Since the aliphatic hydrocarbons suitable as blowing agents are flammable and explosive, the foaming plants have to be fitted with the appropriate safety equipment, as is also necessary when using cyclopentane as blowing agent.

The aliphatic hydrocarbons are advantageously used together with water as blowing agents. The amount of aliphatic hydrocarbons used is from 2 to 25% by weight, preferably from 10 to 13% by weight, based on the component b). The proportion of water depends on the desired bulk density of the polyurethane rigid foams.

e) Catalysts (e) used for producing the polyurethane rigid foams are, in particular, compounds which strongly accelerate the reaction of the compounds of the component (b) containing reactive hydrogen atoms, in particular hydroxyl groups, and, if applicable, (c) with the organic, modified or unmodified polyisocyanates (a). Suitable compounds are organic metal compounds, preferably organic tin compounds such as tin(II), salts of organic carboxylic acids, e.g. tin(II) acetate, tin(II) octanoate, tin(II) ethylhexanoate and tin(II) laurate, and the dialkyltin(IV) salts of organic carboxylic acids, eg. dibutyltin diacetate, dibutyltin dilaurate, dibutyltin maleate and dioctyltin diacetate. The organic metal compounds are used either alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylamino) ethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms, with or without lateral OH groups. Preference is given to using from 0.001 to 5% by weight, in particular from 0.05 to 2% by weight, of catalyst or catalyst combination, based on the weight of the component (b).

f) Auxiliaries and/or additives (f) can, if desired, also be incorporated into the reaction mixture for producing the polyurethane rigid foams. Examples which may be mentioned are surface-active substances, foam stabilizers, cell regulators, fillers, dyes, pigments, flameproofing agents, hydrolysis inhibitors, fungistatic and bacteriostatic substances.

Suitable surface-active substances are, for example, compounds which aid the homogenization of the starting materials and may also be suitable for regulating the cell structure of the plastics. Examples which may be mentioned are emulsifiers such as the sodium salts of castor oil sulfates or of fatty acids, and also fatty acid salts with amines, e.g. diethylamine oleate, diethanolamine stearate, diethanolamine ricinoleate, salts of sulfonic acids, e.g. alkali metal or ammonium salts of dodecylbenzenedisulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey Red oil and peanut oil, and cell regulators such as paraffins, fatty alcohols and dimethylpolysiloxanes. Other substances for improving the emulsifying action, the cell structure and/or the stabilization of the foam are the above described oligomeric acrylates having polyoxyalkylene and fluoroalkane radicals as side groups. The surface-active substances are usually used in amounts of from 0.01 to 5 parts by weight, based on 100 parts by weight of the component (b).

For the purposes of the present invention, fillers, in particular reinforcing fillers, are the usual organic and inorganic fillers, reinforcements, weighting agents, materials for improving the abrasion behavior in paints, coating compositions, etc, known per se. Specific examples are: inorganic fillers such as siliceous minerals, for example sheet silicates such as antigorite, serpentine, hornblendes, amphiboles, chrysotile, talc; metal oxides such as kaolin, aluminum oxides, titanium oxides and iron oxides, metal salts such as chalk, barite, and inorganic pigments such as cadmium sulfide, zinc sulfide, and also glass, etc. Preference is given to using kaolin (china clay), aluminum silicate and coprecipitants of barium sulfate and aluminum silicate and also natural and synthetic fibrous minerals such as wollastonite, metal and, in particular, glass fibers of various lengths, these being able to be sized if desired. Examples of suitable organic fillers are: carbon, melamine, rosin, cyclopentadienyl resins and graft polymers, and also cellulose fibers, polyamide, polyacrylonitrile, polyurethane and polyester fibers based on aromatic and/or aliphatic dicarboxylic esters, and, in particular, carbon fibers.

The inorganic and organic fillers can be used either individually or as mixtures and are advantageously incorporated into the reaction mixture in amounts of from 0.5 to 50% by weight, preferably from 1 to 40% by weight, based on the weight of the components (a) to (c), although the content of mats, nonwovens and woven fabrics of natural and synthetic fibers may be up to 80%.

Suitable flameproofing agents are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloro-ethyl)ethylene diphosphate, dimethylmethane phosphonate, di-ethyl diethanolaminomethyl phosphonate and also commercial halogen-containing flameproofing polyols.

Apart from the halosubstituted phosphates already mentioned, it is also possible to use inorganic or organic flameproofing agents such as red phosphorus, hydrated aluminum oxide, antimony trioxide, arsenic oxide, ammonium polyphosphate and calcium sulfate, expanded graphite or cyanuric acid derivatives such as melamine, or mixtures of at least two flameproofing agents such as ammonium polyphosphates and melamine and also, if desired, maize starch or ammonium polyphosphate, melamine and expanded graphite and/or, if desired, aromatic polyesters for flameproofing the polyisocyanate polyaddition products. In general, it has been found to be advantageous to use from 5 to 50% by weight, preferably from 5 to 25% by weight, of the specified flameproofing agents per 100 parts by weight of the component (b).

However, the polyurethane rigid foams of the invention are usually produced without addition of flameproofing agents.

Further details on the other customary auxiliaries and additives mentioned above are given in the specialist literature, for example the monograph of J. H. Saunders and K. C. Frisch "High Polymers" Volume XVI, Polyurethanes, parts 1 and 2, Interscience Publishers 1962 or 1964, or Kunststoff-Handbuch, Polyurethane, Volume VII, Hanser-Verlag, Munich, Vienna, 3rd Edition, 1993.

For producing the polyurethane rigid foams, the organic polyisocyanates (a), relatively high molecular weight compounds containing at least two reactive hydrogen atoms (b) and, if desired, chain extenders and/or crosslinkers (c) are reacted in such amounts that the equivalents ratio of NCO groups of the polyisocyanates (a) to the sum of the reactive hydrogen atoms of the components (b) and, if applicable (c) is from 0.85 to 1.25:1, preferably from 0.95 to 1.15:1 and in particular from 1 to 1.05:1. If the polyurethane rigid foams contain at least some isocyanurate groups bonded to them, the ratio of NCO groups of the polyisocyanates (a) to the sum of the reactive hydrogen atoms of the component (b) and, if applicable, (c) is usually from 1.5 to 60:1, preferably from 1.5 to 8:1.

For the polyurethane rigid foams of the invention, the reaction is advantageously carried out at an isocyanate index of from 115 to 130.

The polyurethane rigid foams are advantageously produced by the one-shot method, for example by means of the high-pressure or low-pressure technique in open molds. It has been found to be particularly advantageously to use the two-component method and to combine the formative components (b), (d), (e) and, if desired, (c) and (f) in the component (A) and use the organic polyisocyanates or modified polyisocyanates (a) as component (B).

The starting components are mixed at from 15° to 90° C., preferably from 20° to 60° C. and in particular from 20° to 35° C., and introduced into the open or, if desired, under increased pressure into the open mold. Mixing can, as already explained, be carried out mechanically using a stirrer or a stirring screw.

The polyurethane rigid foams produced by the process of the invention have a density of from 0.02 to 0.75 g/cm$^3$, preferably 0.025 to 0.24 g/cm$^3$ and in particular from 0.03 to 0.1 g/cm$^3$. They are particularly suitable as insulation material in the building and refrigeration appliance sector, for example as intermediate layer in sandwich elements or for filling housings of refrigerators and freezer chests with foam.

The following examples illustrate the invention.

EXAMPLE 1

- 42.9 parts by weight of polyether alcohol based on sucrose and propylene oxide, mean equivalent mass 140
- 9.0 parts by weight of polyether alcohol based on sorbitol and propylene oxide, mean equivalent mass 165
- 10.6 parts by weight of polyether alcohol based on glycerol and propylene oxide having a mean equivalent mass of 135
- 6.4 parts by weight of polyether alcohol based on water and propylene oxide having a mean equivalent mass of 90
- 5.0 parts by weight of polyether alcohol based on ethylenediamine and propylene oxide having a mean equivalent mass of 117
- 5.0 parts by weight of polyether alcohol based on ethylenediamine and propylene oxide having a mean equivalent mass of 73
- 14.5 parts by weight of castor oil
- 1.5 parts by weight of foam stabilizer
- 2.5 parts by weight of dimethylcyclohexylamine
- 0.5 part by weight of potassium acetate in ethylene glycol, 50% strength solution
- 2.1 parts by weight of water were mixed. The polyol mixture without stabilizer, catalyst and water had a mean hydroxyl number of 374 mg KOH/g.

100 parts by weight of the complete polyol mixture were mixed with 11 parts by weight of n-pentane and then mixed with 132 parts by weight (corresponds to an isocyanate index of 123) of a mixture of diphenylmethane diisocyanate and polymethyl-polyphenylene polyisocyanates containing 31% by weight of NCO by means of a high-pressure machine and introduced into a lance mold.

The mixture of the polyols and the blowing agent was clear and homogeneous.

The system displayed good curing, ie. at an overall bulk density of 38.0 kg/m$^3$ and a demolding time of 5 minutes, the further blowing in the middle of the lance was zero after 24 hours.

EXAMPLE 2

A polyol mixture was prepared from 43.3 parts by weight of polyether alcohol based on sucrose and propylene oxide, mean equivalent mass 140

10.4 parts by weight of polyether alcohol based on sorbitol and propylene oxide, mean equivalent mass 165

10.7 parts by weight of polyether alcohol based on glycerol and propylene oxide having a mean equivalent mass of 135

6.1 parts by weight of polyether alcohol based on water and propylene oxide having a mean equivalent mass of 95

8.0 parts by weight of polyether alcohol based on ethylenediamine and propylene oxide having a mean equivalent mass of 73

15.0 parts by weight of castor oil 1.5 parts by weight of foam stabilizer 2.4 parts by weight of dimethylcyclohexylamine 0.5 part by weight of potassium acetate in ethylene glycol, 50% strength solution 2.1 parts by weight of water.

The polyol mixture had a mean OH number of 384 mg KOH/g.

100 parts by weight of the polyol mixture are mixed with 11 parts of n-pentane to give a homogeneous and clear mixture and this is foamed, as described in Example 1, with 133 parts by weight of the polyisocyanate used in Example 1.

The system displayed good curing, at an overall bulk density of 37.0 kg/cm$^3$ and a demolding time of 5 minutes, the further blowing in the middle of the lance was zero.

EXAMPLE 3 (COMPARATIVE)

A polyol mixture was prepared from 46.7 parts by weight of a polyether alcohol based on sucrose and propylene oxide having a mean equivalent mass of 118

24.2 parts by weight of a polyether alcohol based on glycerol and propylene oxide having a mean equivalent mass of 125

7.0 parts by weight of a polyether alcohol based on ethylenediamine and propylene oxide having a mean equivalent mass of 117

1.0 part by weight of a polyether alcohol based on water and propylene oxide having a mean equivalent mass of 90

14.5 parts by weight of castor oil 1.5 parts by weight of foam stabilizer 2.5 parts by weight of dimethylcyclohexylamine 0.5 part by weight of potassium acetate in ethylene glycol, 50% strength solution 2.1 parts by weight of water.

The mean OH number of the polyol mixture was 401 mg KOH/g.

100 parts by weight of this polyol component mixed with 11 parts by weight of n-pentane gave a very turbid mixture which demixed after only about 20 minutes. Processing in conventional high-pressure machines was not possible.

EXAMPLE 4 (COMPARATIVE)

A polyol mixture was prepared from 69.2 parts by weight of a polyether alcohol based on sorbitol and propylene oxide having a mean equivalent mass of 165

4.0 parts by weight of a polyether alcohol based on H$_2$O and propylene oxide having a mean equivalent mass of 125

15.0 parts by weight of a polyether alcohol based on H$_2$O and propylene oxide having a mean equivalent mass of 530

5.0 parts by weight of castor oil 1.5 parts by weight of a foam stabilizer 2.8 parts by weight of dimethylcyclohexylamine 0.5 part by weight of potassium acetate in ethylene glycol, 50% strength solution 2.0 parts by weight of water.

The polyol mixture had a mean OH number of 297 mg KOH/g.

100 parts by weight of this polyol component were mixed with 11 parts by weight of n-pentane. This gave a clear, homogeneous mixture. The mixture of polyol component and blowing agent was foamed, as described in Example 1, with 110 parts by weight of the polyisocyanate described in Example 1 (isocyanate index of 113).

The system displayed a very unfavorable curing behavior. Moldings without further blowing were obtained only after demolding times of 8 minutes. This means a lengthening of the residence times of the foamed parts in the tool of up to 60%. Such a time increase is not acceptable under production conditions.

We claim:

1. A process for producing polyurethane rigid foams by reacting
   a) organic polyisocyanates
   b) relatively high molecular weight compounds containing at least two reactive hydrogen atoms and, optionally,
   c) low molecular weight chain extenders and/or crosslinkers in the presence of
   d) blowing agents
   e) catalysts and, optionally,
   f) auxiliaries and additives,
   wherein the relatively high molecular weight compounds containing at least two reactive hydrogen atoms comprise a mixture of
   b1) one or more high-functional, polyether alcohols having functionalities of from 6 to 8 and mean equivalent masses of from 125 to 200,
   b2) one or more polyether alcohols based on aliphatic amines having functionalities of from 3 to 4 and mean equivalent masses of from 70 to 130, b3) one or more low-functional polyether alcohols having functionalities of from 2 to 3 and mean equivalent masses of from 67 to 250, and b4) an OH-containing fatty acid ester.

2. A process as claimed in claim 1, wherein the relatively high molecular weight compounds containing at least two reactive hydrogen atoms which are used comprise a mixture of b1) from 20 to 60 parts by weight of one or more high-functional polyether alcohols having functionalities of from 6 to 8 and mean equivalent masses of from 125 to 200, b2) from 5 to 30 parts by weight of one or more polyether alcohols based on aliphatic amines having functionalities of from 3 to 4 and mean equivalent masses of from 70 to 130, b3) from 3 to 25 parts by weight of one or more low-functional polyether alcohols having functionalities of from 2 to 3 and mean equivalent masses of from 67 to 250, and b4) from 8 to 20 parts by weight of an ester of glycerol and OH-containing fatty acids having a mean hydroxyl number of from 350 to 390 mg KOH/g.

3. A process as claimed in claim 1 or 2, wherein the ester of glycerol and OH-containing fatty acids which is used is castor oil.

4. A process as claimed in any one of claims 1 to 3, wherein the reaction is carried out at an isocyanate index of from 115 to 130.

5. A process as claimed in any one of claims 1 to 4, wherein aliphatic hydrocarbons are used as blowing agents.

6. A process as claimed in claim 5, wherein the blowing agent used is n-pentane and/or iso-pentane.

7. A process as claimed in claim 5 or 6, wherein the blowing agent used is n-pentane.

* * * * *